United States Patent [19]

Niedermeyer

[11] 4,141,340
[45] Feb. 27, 1979

[54] SOLAR ENERGY COLLECTOR

[76] Inventor: William P. Niedermeyer, 1024 Mt. Mary Dr., Green Bay, Wis. 54304

[21] Appl. No.: 804,767

[22] Filed: Jun. 8, 1977

[51] Int. Cl.² ............................................. F24J 3/02
[52] U.S. Cl. .................................................. 126/271
[58] Field of Search ............ 126/270, 271; 237/1 A; 60/641; 350/292, 293, 299; 136/89

[56] References Cited

U.S. PATENT DOCUMENTS

| 3,052,229 | 9/1962 | Wenger | 126/271 |
| 3,279,457 | 10/1966 | Kyryluk | 126/270 |
| 3,490,950 | 1/1970 | Myer | 126/270 |
| 3,982,527 | 9/1976 | Cheng et al. | 126/271 |

Primary Examiner—Kenneth W. Sprague
Attorney, Agent, or Firm—Francis J. Bouda

[57] ABSTRACT

Apparatus for and method of collecting, concentrating, and transmitting solar energy including: one or more reflector surfaces for directing the solar rays to a focus area, absorption means disposed in said focus area, a heat transfer medium external to the focus area, and a heat conduit operatively interconnecting said absorption means, and said transfer medium.

10 Claims, 11 Drawing Figures

U.S. Patent  Feb. 27, 1979  Sheet 1 of 2  4,141,340
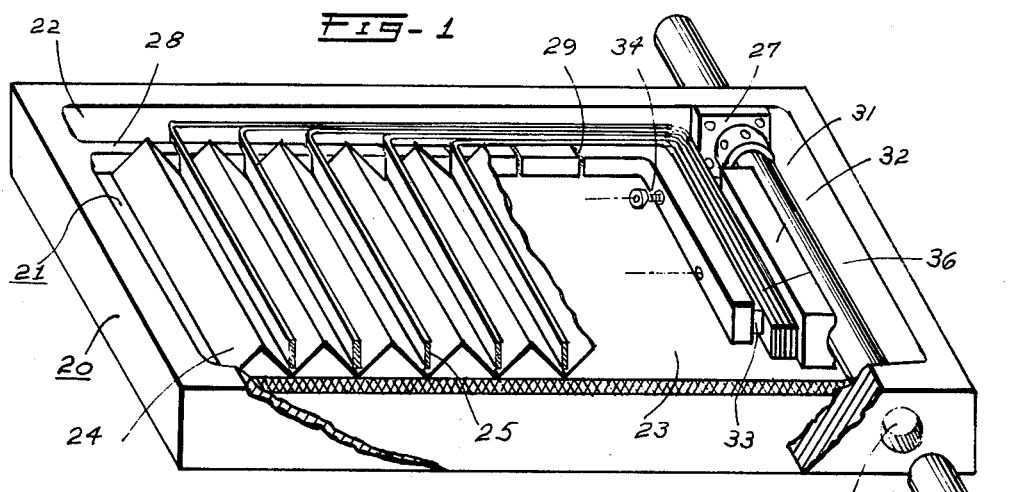
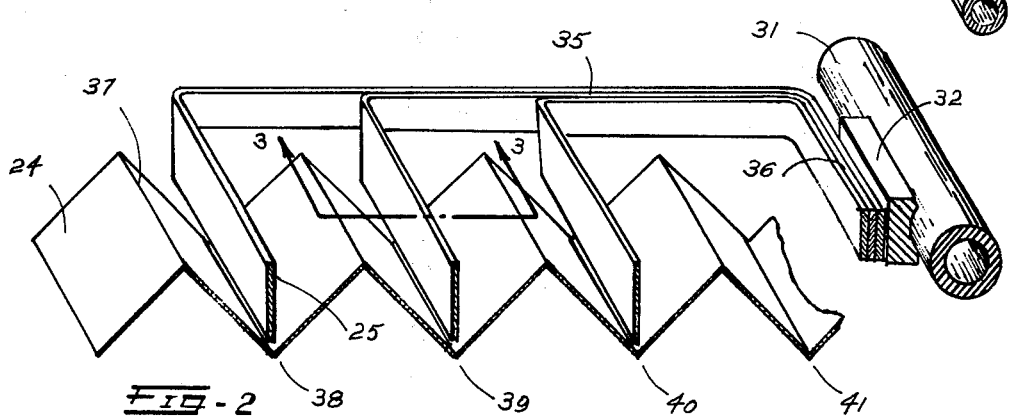
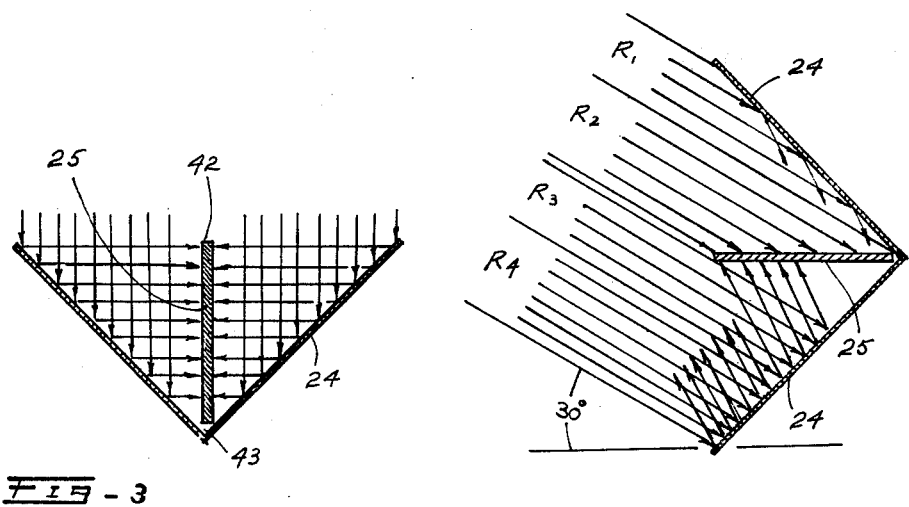

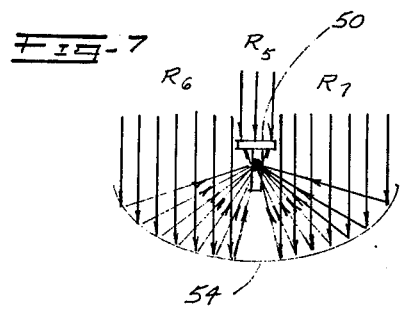
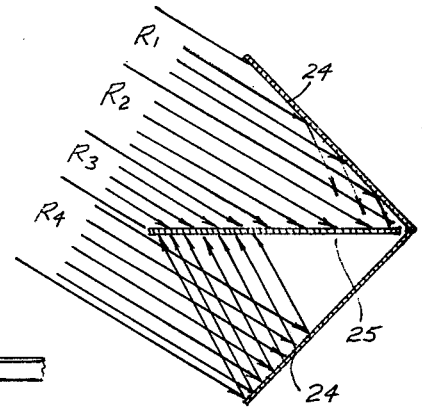
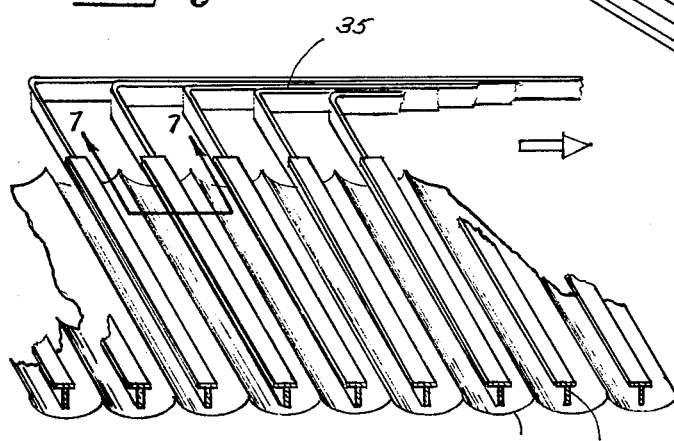
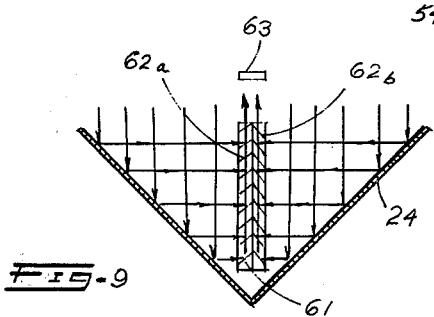
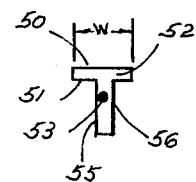
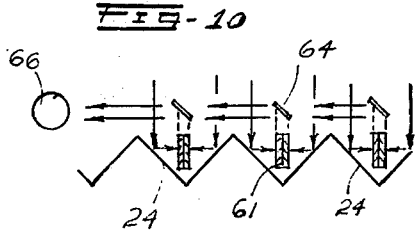
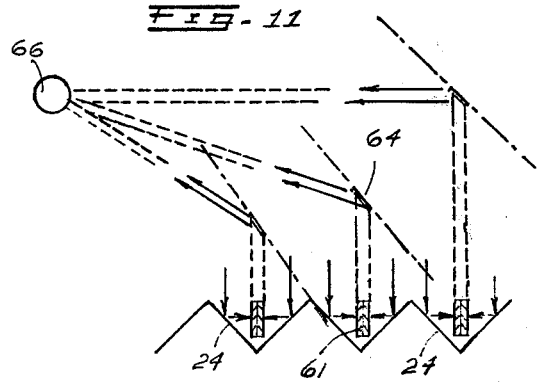

SOLAR ENERGY COLLECTOR

BACKGROUND OF THE INVENTION

This invention relates to a solar energy collecting means, and more particularly to a collector which utilizes the principles of heat conduction to a heat transfer point external of the collection-absorption part of the collector.

The present art defines several well-known collectors, including simple, flat plate collectors for heat transfer to air, liquid, or both, as well as structured shapes for various transfer mediums.

Generally, the collectors described in known art are arranged to accept gaseous or liquid heat transfer medium from a supply system or manifold, and after heat collection and transfer to the medium, to discharge the heated medium to a return system or return manifold. Heat transfer occurs by convection and/or conduction, and is usually accomplished within the confines of the collector-absorption section of the device.

Heat transfer within the collector section is disadvantageous with a liquid system due to the high cost of providing a plurality of pipes similar to those shown in U.S. Pat. Nos. 2,133,649, 3,390,672, and 3,951,129.

Another disadvantage of known art using liquid mediums is the requirement for anti-freeze solutions and/or special expansion fittings to compensate for thermal stress at conduit connections. Despite these precautions, corrosion of internal conduit walls and the possibility of leakage within the collection section prevail.

Many flat plate collectors have specially coated surfaces which absorb solar rays efficiently. Concentrating collectors generally have a contoured surface to direct solar rays to a focal point or line which is within an absorption conduit or pipe similar to U.S. Pat. No. 3,968,786.

U.S. Pat. No. 3,951,129 shows a generally flat surface collector, said surface being modified with a "V" groove and specially treated with a coating for high efficiency solar ray absorption. This reference also teaches the use of monolithic construction with parallel conduits requiring a plurality of inlet and outlet connections for each conduit.

Specified for a different end use, and without collecting, concentrating or conducting means, U.S. Pat. No. 2,783,682 shows a plurality of different configurations used to structure, groove, or contour the surface.

Collectors or absorbers that are substantially planar (with or without structured surfaces) fall within the generic definition of "flat plate" construction, and it is noted that these collectors can only transmit heat at temperatures equal to, or les than, the temperature of the flat absorber surface.

The present invention teaches a unique method for transmitting heat at temperatures greater than the temperature of the reflector surface while retaining the simplicity of "flat plate" construction.

SUMMARY OF THE INVENTION

The primary object of this invention is to utilize reflected rays in a unique way to provide a collector-concentrator panel which can be used for heat transfer to fluid without requiring internal piping and without fluid coming into contact with the collector or concentrator means.

A further object is to provide an inexpensive means to collect reflected parallel or reflected focused rays on a concentrator-conducting means, said means being capable of connection with concentrator-conducting means of adjacent panels before the heat transfer to the liquid occurs.

A further object of this invention is to provide a collector with a plurality of collector grooves cooperative with a plurality of secondary and tertiary reflectors for high gain concentration whereby heat transfer to a liquid medium occurs external of the collector.

A further object is to provide a method which allows reflector surfaces to have considerable length thereby allowing fixed axis pivotable mounting which affect considerable collector areas when activated.

A further object is to provide a method which allows high capacity systems to be installed as a grid system.

A further object is to provide a solar collector surface that is effective when mounted at any angle.

A further object is to provide a collector which has a reflecting surface structured so that effective heat transfer occurs over a wider range of the angle.

A further object is to provide a method and apparatus whereby the panel used for collection and transfer of heat is reduced in thickness, and with no internal piping.

A further object of this invention is to provide a collector panel based on methods which permit change in the "working angle" without changes to the external piping.

A further object is to provide a collector panel which reduces field assembly of auxiliary piping or fluid conduits.

A further object is to reduce power requirements for a closed loop fluid system pump.

A further object is to provide a solar energy collector which does not require close manufacturing tolerances for structuring the reflective surface of the panel.

A further object is to provide collector panels which are easily fitted to existing structures without structural support changes.

A further object is to provide a panel with only two connections, minimizing heat losses and cost.

A further object is to provide panel construction that allows abutting installation of adjacent panels.

A further object is to provide a collector wherein the "working components" can be easily cleaned or replaced.

In the following specifications and descriptions, the word "homogeneous" includes solid or laminated materials without any conduits for conducting the heat transfer medium.

With the above and other objects in view, more information and understanding of the present invention may be achieved by reference to the following detailed description.

DESCRIPTION OF THE DRAWINGS

FIG. 1 is a perspective view showing one form of solar collector panel of the present invention.

FIG. 2 is similar to FIG. 1 showing in greater detail portions of the components of the preferred embodiment.

FIG. 3 is a schematic end view along line 3—3 of FIG. 2 showing a singular groove with reflector surfaces and a centrally located conductor.

FIG. 4 is similar to FIG. 3, with the collector panel mounted against a vertical surface and the solar angle at 30 degrees to the horizontal.

FIG. 5 is the same as FIG. 4 except the central absorber plate is extended.

FIG. 6 is a perspective view of another embodiment of the present invention with a plurality of parabolic reflectors and a special T-shaped conductor.

FIG. 7 is a cross-sectional view taken generally along line 7—7 of FIG. 6 showing placement of the T-shaped conductor on a vertical centerline common to the focal area, said focal area being below the topmost portion of the conductor.

FIG. 8 shows details of the T-shaped conductor shown in FIGS. 6 and 7.

FIG. 9 shows one arrangement for a laminated specially coated secondary reflector, useful with "V" groove reflector surface to yield medium gain concentration.

FIG. 0 shows another arrangement with a plurality of laminated secondary reflectors in combination with a plurality of tertiary reflectors for high gain concentration to an external and remote heat transfer point.

FIG. 11 shows an arrangement similar to FIG. 10, except that each of the associated tertiary reflectors is mounted at a different angle for high gain concentration to an external and remote heat transfer point.

DETAILED DESCRIPTION OF THE INVENTION

In FIG. 1, a solar panel 20 consisting of a central chamber 21, and a conduit or conductor chamber 22 is connected to and is a part of larger heat transfer chamber 23. Reflectors 24 and associated concentrator-conductors 25 are mounted in chamber 21. Conductors 25 transmit heat along their extended length through side support and chamber separating wall 28 which has slotted openings 29 allowing extended length of conductors 25 to pass therethrough. Similar slots (not shown) support the conductor at the opposite end. Slotted openings 29 are spaced at intervals, said intervals coinciding with the pitch between centerlines of adjacent groove or contour of surface 24.

Conductors 25 are secured on both ends near slots 29. Clamps or other securing devices are not shown, but are desirable to keep the conductors in the center of the reflector surfaces and at the correct elevation. The frame 20 will have heat transfer pipe inlet holes 26. When the panels are mounted side by side, a common heat transfer pipe 31 is inserted through the hole 26 in the frame sides and locking flanges 27 rigidly connect frame and pipe in non-rotating relationship. The end 36 of the Conduit 35 are mounted in intimate contact as a closely bound laminate in the chamber 23. Closely bound conductors are pressed against heat transfer bar 32 which is contoured for intimate contact with pipe 31 and transmits heat from the side-by-side conductors. The conduits 25 and bar 32 are held in intimate contact with pipe 31 by pressure bar 33 and pressure adjusting screw 34.

Referring to FIG. 2, this invention teaches the use of three basic principles used in solar collectors, namely radiation-reflection, concentration-collection, and conduction-transfer.

In FIG. 2, a corrugated or undulating surface, having ridges 3 zeniths or apexes 37 is structured with a plurality of grooves valleys or nadirs 38, 39, 40, and 41. Each groove in FIG. 2 is formed by two surfaces at 90 degrees to each other.

The collector panels in FIGS. 1 and 2 are preferably mounted so that solar rays impinge normal to the top surface and normal to the said major planar surface. In the preferred embodiment shown, reflected rays are directed to conduits 25. Solar rays from reflectors 24 impinge normal to the surfaces of conduits 25 minimizing heat loss from deflection and resulting in a concentrator effect. Heat from the concentrator portion are conducted by coextensive portions 35 to heat transfer portion 36 and to fluid carrying pipe 31.

In FIG. 2, a plurality of grooves with flat sides are shown, however, other contoured or structured grooves are within the scope of this invention as shown in FIG. 6.

In FIG. 3 the solar rays are directed at a 45 degree angle of incidence to the surfaces, then re-directed to conductor 25. In this preferred embodiment the concentrating effect is doubled, that is, the amount of heat absorbed by conductor 25 will equal reflected heat adjacent from surfaces 24 plus directly absorbed heat on surface 42. In practice the total absorbed heat will be reduced by convection as well as absorption heat loss at surfaces 24.

Concentrator-conductor bar 25 is isolated from reflective surfaces 24 by gap 43 said gap being as small as possible to permit maximum absorption of rays reflected near the apex of the "V" groove. This gap is not critical with focal point (line) concentrators, for example FIG. 7 or other structured shapes where reflected rays at the apex or bottom of the contour are reflected in a direction substantially parallel with incoming rays. If necessary and when long reflector surfaces are used, the gap can include spaced insulate supports for the conductor.

Vertical mounting of collectors according to this preferred embodiment will produce efficient results, particularly with modifications per FIG. 5. For example, when constructed as a doubling concentrator and mounted vertically per FIG. 4, solar insolation increases from a low value at summer solstice to a higher value at winter solstice (based on a southward facing installation in North latitudes), and according, a vertical collector will absorb less radiation in summer and a maximum in winter solstice. This beneficial effect is especially useful when a plurality of vertically and horizontally mounted collectors coact as a system, since decreasing heat transfer from vertically mounted collectors (from winter solstice to summer solstice — N. latitudes) will be compensated for by increasing heat transfer from collectors mounted substantially horizontally. This relationship, and the importance of collector construction suitable for vertical and horizontal mounting can be appreciated, especially when lower collector and installation costs make it more economically feasible to install panels over a much greater building area that is exposed to solar insolation. As described in the preferred embodiment of FIG. 3, maximum heat collection occurs on horizontally mounted panels during summer solstice, and although vertically mounted collectors will contribute very little transferred energy, maximum possible collection and higher concentrator values are obtainable from horizontally mounted collectors, this result being desirable for better utilization of air conditioning or cooling systems.

FIG. 4 shows a single groove with reflector surfaces 24 and a central absorber plate 25 as they would appear in a vertically mounted collector. In FIG. 4, it is assumed that the solar angle of incidence is 30 degrees above horizontal, and the central collector-concentrator defines a doubling ratio. Since total heat collection in the winter is more important than the concentrator ratio, it is desirable to reduce reflected loss from rays R to a minimum. In FIG. 5, the concentrator-conductor plate is extended.

FIG. 4 shows that solar rays in zone $R_1$ are reflected from surface 24, zone rays $R_2$ are absorbed at 25, zone $R_3$ rays are reflected from 24 beyond the absorber and are not useful for heat transfer to fluid. In FIG. 5, with the absorber plate extended, rays in zone $R_3$ are absorbed by the extension of surface 25, and rays in zone $R_4$ are reflected from 24 and absorbed by the extension of 25. The concentrator effect is reduced from 1:2 shown in FIG. 4 to about 1.0:1.3. When heating or air conditioning sub-systems make it advantageous to use higher temperature liquids, a higher concentrator effect can be produced using the embodiment shown in FIG. 6. The use of parabolic shapes 54 to concentrate parallel incoming solar rays to a focal point or focal line is well known in the art, however, teaching the use of a homogeneous solid absorberconductor is new. This solid conductor can be circular or non-circular. FIG. 8 shows a "T" shaped structure which can achieve concentration ratios of up to about eight times. This advantageous shape reduces reflective loss at the top surface 50 since it is normal to incoming solar rays. Top surface 50 and under surfaces 51 are parallel and are both located above a focal point or focal line 53. In FIG. 7 solar rays $R_5$ are absorbed by surface 50, and rays $R_6$ and $R_7$ are reflected by a contoured surface 54 and are concentrated at focal point or line 53. The width W of surface 50 is chosen to absorb a selected band $R_5$ of solar rays that would normally pass downwardly beyond the conductor 52 until reflected upwardly back by surface 54. These rays would normally impinge on surfaces 55 and 56 at small acute angles and would be subject to high reflective loss. Surface 51 is normal to the major axis of conductor 52 and is substantially normal to the closest rays in bands $R_6$ and $R_7$ which pass the edges of top surfaces 50 in close proximity. Surface 51 is an effective absorber for rays reflected from surface 55 and 56 at small acute angles.

Heat available from solar rays is expressed in BTU/HR per sq. ft. of collector surface. For a given size, this heat is useable in low, medium, and high temperature applications, with an increase in concentrator-ratio as temperature increases.

In FIG. 9, a secondary reflector 61 of special construction is shown, said reflector comprising a plurality of reflectors 62a and 62b, which redirect and compound reflected rays to impinge on a conductor 63; specially coated "one way" surfaces are required. Coatings will reflect rays which are directed against the reflective surface, while simultaneously allowing other redirected rays to be transmitted through said coating when said other redirected rays impinge on the nonreflective side of such coating. This is similar to the effect of "one way" mirrors.

In this embodiment, concentration ratios of high magnitude can be achieved, these ratios being a function of reflector width, reflector substrate, reflector coating and light transmission factor.

FIG. 10 shows an advantageous construction using reflectors 24 with secondary laminar reflectors 62a and 62b, and a tertiary reflector 64 having a special coating which would allow transmission of rays from the side opposite the reflective surface, all compounded rays being focused in a narrow band on an absorbing conductor 66. In FIG. 10, the secondary and tertiary reflectors are shown above the surface of the primary reflector, however it is obvious that reversing the direction of reflection of the secondary reflector and mounting the tertiary reflector below the primary reflective surface would be advantageous because there would be no obstructions above the primary reflector to hinder maximum solar insolation.

FIG. 11 shows another arrangement using secondary reflector 61 (or a plurality of secondary reflectors) which are specially coated and used in combination with tertiary reflectors 64, which are reflectors only and are not specially coated to allow transmission of rays from the opposite side.

It is within the scope of this invention that rays emitting from the tertiary reflector can be directed toward a fourth reflector surface, said surface to be flat or to be contoured for concentrating to a distant focal point. It is also within the scope of this invention that the primary surface reflector could be pivotable about one axis, and in some arrangements, for example FIG. 11, the tertiary reflectors would also be pivotable.

It is to be understood that the present invention may be embodied in other specific forms without departing from the spirit or special attributes hereof, and it is therefore desired that the present embodiments be considered in all respects as illustrative, and therefore not restrictive, reference being made to the appended Claims rather than to the foregoing description to indicate the scope of the invention.

Having thus described my invention, what I claim as new and desire to protect by Letters Patent are the following:

1. Apparatus for collecting, concentrating, and transmitting solar energy, including at least one reflector surface for directing the solar rays to a focus area, the reflector surface having a nadir and a ridge, absorption means disposed at least in part in said focus area, a heat transfer medium external to the focus area, and a heat conduit operatively interconnecting said absorption means and said transfer medium, each of the absorption means, transfer medium and heat conduit disposed above the nadir.

2. The apparatus of claim 1 wherein the collector absorption means is a rectangular strip.

3. The apparatus of claim 1 wherein the collector absorption means is a metallic bar T-shaped cross section.

4. The apparatus of claim 1 wherein the reflector consists of two surfaces disposed at 90 degrees to each other to provide a V-shaped groove.

5. The apparatus of claim 1 wherein the reflector is a parabolic curve.

6. The apparatus of claim 1 wherein the reflector includes both a V-shaped and a parabolic shaped portion, and the collector absorption means is substantially rectangular in shape with a semi-circular edge disposed opposite the direction of the approaching solar rays.

7. The apparatus of claim 1 wherein the absorption means includes a plurality of secondary reflectors.

8. Apparatus for collecting, concentrating, and transmitting solar energy, including at least one reflector surface for directing the solar rays to a focus area, a planar absorption means separated from and located above the apex of the reflector, said adsorption means oriented substantially vertically and disposed at least in part in said focus area, a heat transfer medium external to, and at least partially above the focus area, one coextensive edge portion of said absorption means interconnecting said absorption means and said transfer means.

9. The apparatus of claim 8 wherein an edge of the rectangular planar absorber is connected directly to the external heat transfer surface of a fluid conveying means.

10. The apparatus of claim 8 wherein the reflector surface is a parabolic curve and the absorber is a T-shaped monolithic metallic cross section, with the top horizontal portion of said T-shaped absorber being above the zenith of the reflector surface.

* * * * *